United States Patent
Ogawa et al.

(10) Patent No.: US 10,533,085 B2
(45) Date of Patent: Jan. 14, 2020

(54) POLYETHYLENE FOR INJECTION MOLDING AND MOLDED ARTICLE USING SAME

(71) Applicant: Japan Polyethylene Corporation, Chiyoda-ku (JP)

(72) Inventors: Kouichi Ogawa, Kanagawa (JP); Kenji Hadano, Kanagawa (JP); Kazuhiro Kobayashi, Kanagawa (JP)

(73) Assignee: Japan Polyethylene Corporation, Chiyoda-ku (JP)

( * ) Notice: Subject to any disclaimer, the term of this patent is extended or adjusted under 35 U.S.C. 154(b) by 214 days.

(21) Appl. No.: 15/561,137

(22) PCT Filed: Mar. 25, 2016

(86) PCT No.: PCT/JP2016/059608
§ 371 (c)(1),
(2) Date: Sep. 25, 2017

(87) PCT Pub. No.: WO2016/153037
PCT Pub. Date: Sep. 29, 2016

(65) Prior Publication Data
US 2018/0051164 A1    Feb. 22, 2018

(30) Foreign Application Priority Data
Mar. 26, 2015  (JP) .................... 2015-065098

(51) Int. Cl.
*C08L 23/06*    (2006.01)
*C08J 5/00*    (2006.01)
(Continued)

(52) U.S. Cl.
CPC .......... *C08L 23/06* (2013.01); *B29C 45/0001* (2013.01); *C08J 5/00* (2013.01);
(Continued)

(58) Field of Classification Search
CPC .. C08L 23/06; C08L 23/0807; C08L 2205/02; C08L 2205/025; C08J 5/00;
(Continued)

(56) References Cited

U.S. PATENT DOCUMENTS 6,863,941 B2   3/2005  Detounay
8,697,806 B2   4/2014  Michie, Jr. et al.
(Continued)

FOREIGN PATENT DOCUMENTS

CN   1476464 A   2/2004
CN   101323682 A   12/2008
(Continued)

OTHER PUBLICATIONS

Combined Chinese Office Action and Search Report dated May 8, 2019 in Chinese Patent Application No. 201680018747.7 (with English translation and English translation of Category of Cited Documents), 18 pages.
(Continued)

*Primary Examiner* — Michael C Miggins
(74) *Attorney, Agent, or Firm* — Oblon, McClelland, Maier & Neustadt, L.L.P.

(57) ABSTRACT

An object of the present invention is to provide a polyethylene for injection molding, which has an excellent balance between moldability and durability, and a molded article such as an injection-molded plastic fuel tank that has an excellent balance among injection moldability, durability, and impact resistance. The invention relates to a polyethylene for injection molding, the polyethylene comprising at least two types of specific polyethylenes, wherein the density, the high load melt flow rate, and the relationship between the weight ratio and the density of the polyethylene satisfy specific characteristics.

13 Claims, 1 Drawing Sheet

(51) Int. Cl.
*B29C 45/00* (2006.01)
*B29K 23/00* (2006.01)

(52) U.S. Cl.
CPC ............ *B29C 2945/76545* (2013.01); *B29C 2945/76612* (2013.01); *B29C 2945/76615* (2013.01); *B29K 2023/0608* (2013.01); *C08L 2205/02* (2013.01)

(58) Field of Classification Search
CPC ...... B29C 25/0001; B29C 2945/76545; B29C 2945/76612; B29C 2945/76615; C08F 2/001; B29K 2023/0608
See application file for complete search history.

(56) References Cited

U.S. PATENT DOCUMENTS

| | | | |
|---|---|---|---|
| 9,181,421 | B2 | 11/2015 | Michie, Jr. et al. |
| 9,475,926 | B2 | 10/2016 | Akutsu et al. |
| 2004/0181010 | A1 | 9/2004 | Miserque et al. |
| 2005/0170112 | A1 | 8/2005 | Lequeux et al. |
| 2008/0011709 | A1 | 1/2008 | Ibayashi et al. |
| 2008/0221273 | A1 | 9/2008 | Michie, Jr. et al. |
| 2010/0084363 | A1 | 4/2010 | Michie, Jr. et al. |
| 2015/0045485 | A1 | 2/2015 | Tsutimoto et al. |
| 2016/0237266 | A1 | 8/2016 | Michie, Jr. et al. |
| 2019/0031867 | A1 | 1/2019 | Michie, Jr. et al. |

FOREIGN PATENT DOCUMENTS

| | | |
|---|---|---|
| CN | 101356225 A | 1/2009 |
| CN | 103396604 A | 11/2013 |
| EP | 1 201 713 A1 | 5/2002 |
| EP | 1 359 191 A1 | 11/2003 |
| JP | 2001-71759 A | 3/2001 |
| JP | 2008-19404 A | 1/2008 |
| JP | 2008-114819 A | 5/2008 |
| JP | 2009-535490 A | 10/2009 |
| JP | 2011-132329 A | 7/2011 |
| JP | 5103289 B2 | 12/2012 |
| JP | 2013-117018 A | 6/2013 |
| JP | 2013-203915 A | 10/2013 |
| JP | 2013-203983 A | 10/2013 |
| JP | 2014-129875 A | 7/2014 |
| JP | 2014-240498 A | 12/2014 |
| WO | 02/34829 A1 † | 5/2002 |
| WO | WO 2007/130515 A2 | 11/2007 |
| WO | 2008/136849 A1 † | 11/2008 |
| WO | WO 2011/126029 A1 | 10/2011 |
| WO | WO 2014/180989 A1 | 11/2014 |
| WO | WO 2015/101668 A1 | 7/2015 |

OTHER PUBLICATIONS

Extended Search Report dated Jan. 18, 2018 in European Patent Application No. 16768940.5.
International Search Report dated Jul. 12, 2016, in PCT/JP2016/059608, filed Mar. 25, 2016.
Japanese Office Action dated Apr. 1, 2019 in Japanese Patent Application No. 2016-061063 (with unedited computer generated English translation), 8 pages.
European Office Action dated Jul. 31, 2019 in European Patent Application No. 16768940.5, 19 pages.
INEOS, Olefins & Polymers USA, "Environmental Stress Crack Resistance of Polyethylene", May 2008, 6 pages.
Böhm, L.L., et al., "High-Density Polyethylene Pipe Resins", Research News, Advanced Materials, vol. 4 No. 3, 1992, pp. 234-238.
Hagström, B., "Prediction of melt flow rate (MFR) of bimodal Polyethylene's based on MFR of their components", Conference of Polymer Processing, Aug. 19-21, 1997, 3 pages.
McAuley and MacGregor, On-Line Inference of Polymer Properties in an Industrial Polyethylene Reactor, AIChE Journal, vol. 37, No. 6, pp. 825-835 (Jun. 1991).†

† cited by third party

POLYETHYLENE FOR INJECTION MOLDING AND MOLDED ARTICLE USING SAME

TECHNICAL FIELD

The present invention relates to a polyethylene for injection molding and a molded article using the same. More specifically, it relates to a polyethylene-based resin material for a molded article, particularly a fuel tank, the material being excellent in durability and impact resistance of the resulting molded article while maintaining good injection moldability in a polyethylene for injection molding, and an injection-molded fuel tank or the like using the material.

BACKGROUND ART

In recent years, in the field of the fuel tank for automobiles, the formation of a product from a resin has been actively promoted for the purpose of weight reduction and energy saving. As a resin material, from the viewpoints of inexpensiveness, high strength, good weather resistance, good chemical resistance, recycling ability, and the like, a polyethylene has been generally used as a main material. Further, the resin-made fuel tank has been produced by a large-sized blow molding as a mainstream.

However, the large-sized blow molding has problems that the molding machine is specialized, the productivity decreases due to the generation of waste materials such as burr, wall thickness distribution of the molded article becomes uneven, fuel permeability from a blow-molded pinch part, and the like.

In order to solve these problems, there has been proposed plastic fuel tanks and the like produced by molding methods other than the blow molding, for example, an injection molding method (e.g., see Patent Documents 1 to 4).

For example, Patent Document 1 discloses a fuel tank for automobiles, which tank is composed of a polyethylene having specific density, dispersion index, and melt flow index.

Patent Document 2 proposes a polyethylene-based resin for an injection-molded plastic fuel tank, wherein (1) a density is 0.940 to 0.970 g/cm$^3$, (2) a high load melt flow rate (HLMFR) is 6 g/10 minutes or more, (3) a shear viscosity at 230° C. and a shear rate of 243 sec$^{-1}$ is 10,000 poise or less, (4) a Charpy impact strength at −40° C. is 5 kJ/m$^2$ or more, and (5) a rupture time in a full notch creep test (measured at 80° C., 6 MPa) is 80 hours or more, as an injection-molded plastic fuel tank excellent in a balance among injection moldability, durability, and impact resistance.

Further, Patent Document 3 proposes a polyethylene-based resin molding material for a container, which material is a composition containing an ethylene-based polymer component (A) having a high load melt flow rate (HLMFR) of 0.1 to 1.0 g/10 minutes and a density of 0.910 to 0.930 g/cm$^3$ in an amount of 20% by weight or more and less than 30% by weight and an ethylene-based polymer component (B) having a melt flow rate (MFR) of 150 g/10 minutes or more and less than 400 g/10 minutes and a density of 0.960 g/cm$^3$ or more in an amount of more than 70% by weight and 80% by weight or less and which material satisfies characteristic (1) (MFR being 0.4 g/10 minutes or more and less than 2.0 g/10 minutes and HLMFR being 70 g/10 minutes or more and less than 180 g/10 minutes, and HLMFR/MFR being 100 to 200) and characteristic (2) (density being 0.953 g/cm$^3$ or more and less than 0.965 g/cm$^3$), as a polyethylene-based resin molding material for a container, the use application being different from the fuel tank for automobiles.

Moreover, Patent Document 4 proposes a high density polyethylene composition comprising a first component, the first component being a high-molecular-weight ethylene-α-olefin copolymer having a density ranging from 0.915 to 0.940 g/cm$^3$ and a melt index ($I_{21.6}$) ranging from 0.5 to 10 g/10 minutes, and a second component, the second component being a low-molecular-weight ethylene-based polymer having a density ranging from 0.965 to 0.980 g/cm$^3$ and a melt index (I2) ranging from 50 to 1500 g/10 minutes, wherein the high density polyethylene composition has a melt index ($I_2$) of at least 1 g/10 minutes, a density ranging from 0.950 to 0.960 g/cm$^3$, and a g' of 1 or more.

PRIOR ART DOCUMENTS

Patent Documents

Patent Document 1: JP-A-2001-71759
Patent Document 2: JP-A-2008-114819
Patent Document 3: JP-A-2008-019404
Patent Document 4: JP-T-2009-535490 (the term "JP-T" as used herein means a published Japanese translation of a PCT patent application)

SUMMARY OF THE INVENTION

Problems that the Invention is to Solve

However, in Patent Document 1, from the relationship between the molecular weight distribution and MFR, there is an insufficient point in view of fluidity necessary for moldability.

Moreover, in all the materials, further improvement in performance is required as a polyethylene-based resin material for a molded article, particularly a fuel tank, which material exhibits excellent durability and impact resistance of the resulting molded article while maintaining good injection moldability.

In consideration of the above circumstances, an object of the present invention is to provide a material for a molded article, which material exhibits excellent durability and impact resistance of the resulting molded article, particularly a polyethylene-based resin material for a fuel tank while maintaining good injection moldability, and a molded article.

Means for Solving the Problems

As a result of intensive studies for solving the above problems and studies of a material that sufficiently meets the characteristics required for the injection-molded plastic fuel tank and the like, the present inventors have found that a molded article having an excellent balance between moldability and durability is obtained from a polyethylene-based resin whose density, fluidity, alignment, and the like fall within specific ranges. Thus, they have accomplished the present invention.

That is, according to the first invention of the invention, a polyethylene for injection molding, which comprises at least the following component (a) and component (b) and satisfies the following characteristics (1) to (3), is provided:

Component (a): a polyethylene having a density of 0.910 to 0.940 g/cm$^3$ and a high load melt flow rate (HLMFR) (test conditions: 190° C., a load of 21.6 kg) of 0.1 to 5.0 g/10 minutes, Component (b): a polyethylene having a density of 0.960 to 0.980 g/cm$^3$ and a melt flow rate (MFR) (test conditions: 190° C., a load of 2.16 kg) of 1 to 500 g/10 minutes, Characteristic (1): a density is 0.935 to 0.970 g/cm$^3$, Characteristic (2): HLMFR is 50 to 200 g/10 minutes, Characteristic (3): a relation of a weight ratio Wa (%) of the component (a) to the total weight of the component (a) and the component (b) and the density Da (g/cm$^3$) of the component (a) satisfies the following formula (1):

$$Wa \geq 832 \times Da - 730 \qquad \text{Formula (1).}$$

According to the second invention of the invention, the polyethylene for injection molding according to the first invention, which further satisfies the following characteristic (4), is provided:

Characteristic (4): a ratio of weight-average molecular weight (Mw) to number-average molecular weight (Mn) (Mw/Mn) measured by gel permeation chromatography (GPC) is 10 or more.

According to the third invention of the invention, the polyethylene for injection molding according to the first or the second invention, which further satisfies the following characteristic (5), is provided:

Characteristic (5): a rupture time in a full notch creep test (test conditions: 80° C., 6 MPa) is 20 hours or more.

According to the fourth invention of the invention, the polyethylene for injection molding according to any one of the first to third inventions, which further satisfies the following characteristic (6):

Characteristic (6): a Charpy impact strength at −40° C. is 4.0 kJ/m$^2$ or more.

According to the fifth invention of the invention, a molded article obtained by injection molding using the polyethylene for injection molding according to any one of the first to fourth inventions, is provided.

According to the sixth invention of the invention, the molded article according to the fifth invention, wherein the molded article is at least any one selected from the group consisting of a fuel tank, an oil tank, a urea water tank and a welding part, is provided.

Advantage of the Invention

According to the present invention, there can be provided a material for a molded article, which material exhibits excellent durability and impact resistance of the resulting molded article, particularly a polyethylene-based resin material for a fuel tank while maintaining a good injection moldability, and a molded article.

MODES FOR CARRYING OUT THE INVENTION

The polyethylene for injection molding of the present invention is a polyethylene which contains at least the following components (a) and (b) and satisfies the following characteristics (1) to (3).

Hereinafter, the resin of the invention and use applications thereof will be described in detail for each item. The word "to" showing a numerical value range in the present Description is used in the sense that the numerical values described before and after the word are included as a lower limit value and an upper limit value.

1. Components Constituting Polyethylene for Injection Molding 1-1. Component (a)

The component (a) contained in the polyethylene for injection molding of the invention is an ethylene homopolymer or a copolymer of ethylene and an α-olefin having 3 to 20 carbon atoms. The production method of the ethylene homopolymer or the copolymer of ethylene and an α-olefin having 3 to 20 carbon atoms will be mentioned later.

The polyethylene of the component (a) has a density of 0.910 to 0.940 g/cm$^3$, preferably 0.912 to 0.938 g/cm$^3$, and more preferably 0.915 to 0.935 g/cm$^3$. The density can be measured by the same method as in the case of the density of the characteristic (1) to be mentioned later.

When the density is less than 0.910 g/cm$^3$, an insufficient rigidity of the molded article becomes obvious, whereas, when it exceeds 0.940 g/cm$^3$, the durability is insufficient.

The control of the density can be, for example, performed by varying the amount of the α-olefin to be copolymerized with ethylene, and an increase in the amount of the α-olefins can reduce the density.

The polyethylene of the component (a) has a high load melt flow rate (HLMFR) (test conditions: 190° C., a load of 21.6 kg) of 0.1 to 5.0 g/10 minutes, more preferably 0.2 to 4.5 g/10 minutes, and further preferably 0.3 to 4.0 g/10 minutes. HLMFR can be measured by the same method as in the case of HLMFR of the characteristic (2) to be mentioned later.

When HLMFR is less than 0.1 g/10 minutes, the fluidity is insufficient at the time of injection molding and molding becomes in an unstable state, so that the case is not practical. When HLMFR exceeds 5.0 g/10 minutes, there is a tendency that the impact resistance decreases.

The control of HLMFR can be achieved either by varying the amount of the chain transfer agent (hydrogen or the like) that coexists during ethylene polymerization or by varying polymerization temperature, and HLMFR can be increased by increasing the amount of hydrogen or by raising the polymerization temperature.

1-2. Component (b)

The component (b) contained in the polyethylene for injection molding of the invention is an ethylene homopolymer or a copolymer of ethylene and an α-olefin having 3 to 20 carbon atoms. The production method of the ethylene homopolymer or the copolymer of ethylene and an α-olefin having 3 to 20 carbon atoms will be mentioned later.

The polyethylene of the component (b) has a density of 0.960 to 0.980 g/cm$^3$, preferably 0.962 to 0.978 g/cm$^3$, and more preferably 0.965 to 0.975 g/cm$^3$. The density can be measured by the same method as in the case of the density of the characteristic (1) to be mentioned later.

When the density is less than 0.960 g/cm$^3$, an insufficient rigidity of the molded article becomes obvious, whereas, when it exceeds 0.980 g/cm$^3$, the impact resistance is insufficient.

The control of the density can be, for example, performed by varying the amount of the α-olefin to be copolymerized with ethylene, and an increase in the amount of the α-olefins can reduce the density.

The polyethylene of the component (b) has a melt flow rate (MFR) (test conditions: 190° C., a load of 2.16 kg) of 1 to 500 g/10 minutes, more preferably 5 to 480 g/10 minutes, and further preferably 10 to 450 g/10 minutes. MFR can be measured according to ISO1133 under measurement conditions D: 190° C., a load of 2.160 kg (21.183 N) in accordance with JIS K6922-1 (1997) "Plastic—Polyethylene (PE) Molding and Extruding Materials—Part 1: System of Naming and Basis of Notation of Specifications".

When MFR is less than 1 g/10 minutes, the fluidity is insufficient at the time of injection molding and molding becomes in an unstable state, so that the case is not practical. When MFR exceeds 500 g/10 minutes, there is a tendency that the impact resistance decreases.

The control of MFR can be achieved either by varying the amount of the chain transfer agent (hydrogen or the like) that coexists during ethylene polymerization or by varying the polymerization temperature, and MFR can be increased by increasing the amount of hydrogen or by raising the polymerization temperature.

2. Characteristics of Polyethylene for Injection Molding

The polyethylene for injection molding of the invention satisfies the following characteristics (1) to (3), and preferably further satisfies at least any one of characteristics (4), (5), (6), and (7).

Characteristic (1): Density

The polyethylene for injection molding of the invention has a density of 0.935 to 0.970 g/cm$^3$, preferably 0.936 to 0.968 g/cm$^3$, and more preferably 0.940 to 0.965 g/cm$^3$.

The density is measured by melting a pellet in a thermal compression molding machine at a temperature of 160° C., then lowering the temperature at a rate of 25° C./minute to form a sheet having a thickness of 2 mm, controlling the conditions of the sheet in a room at a temperature of 23° C. for 48 hours, and subsequently placing the sheet in a density gradient tube, in accordance with JIS K7112 (1999) "Plastic—Method for Measuring Density and Specific Gravity of Non-Foaming Plastic".

When the density is less than 0.935 g/cm$^3$, an insufficient rigidity of the molded article becomes obvious, whereas. when it exceeds 0.970 g/cm$^3$, the durability is insufficient.

The control of the density can be, for example, performed by varying the amount of the α-olefin to be copolymerized with ethylene, and an increase in the amount of the α-olefins can reduce the density.

Characteristic (2): High Load Melt Flow Rate (HLMFR)

The polyethylene for injection molding of the invention has a high load melt flow rate (HLMFR) (test conditions: 190° C., a load of 21.6 kg) of 50 to 200 g/10 minutes, preferably 55 to 155 g/10 minutes, and more preferably 60 to 150 g/10 minutes.

The high load melt flow rate (HLMFR) at a temperature of 190° C. and a load of 21.6 kg is measured according to ISO1133 under measurement conditions G: 190° C., a load of 21.60 kg (211.83 N) in accordance with JIS K6922-1 (1997) "Plastic—Polyethylene (PE) Molding and Extruding Materials—Part 1: System of Naming and Basis of Notation of Specifications".

When HLMFR is less than 50 g/10 minutes, the fluidity becomes insufficient at the time of injection molding and molding becomes in an unstable state, so that the case is not practical. When HLMFR exceeds 200 g/10 minutes, there is a tendency that the impact resistance decreases.

The control of the high load melt flow rate (HLMFR) at a temperature of 190° C. and a load of 21.6 kg can be achieved either by varying the amount of the chain transfer agent (hydrogen or the like) that coexists during ethylene polymerization or by varying the polymerization temperature, and HLMFR can be increased by increasing the amount of hydrogen or by raising the polymerization temperature.

Characteristic (3): In the polyethylene for injection molding of the invention, the relation of a weight ratio Wa (%) of the component (a) to the total weight of the component (a) and the component (b) and the density Da (g/cm$^3$) of the component (a) satisfies the following formula (1):

$$Wa \geq 832 \times Da - 730 \qquad \text{Formula (1)}.$$

In the invention, it is important that the polyethylene of the component (a) has a density of 0.910 to 0.940 g/cm$^3$. Further, in the invention, the weight ratio of the component (a) to the total weight of the component (a) and the component (b) becomes an important requirement for exhibiting the performance of the polyethylene of the invention.

That is, at the time of using the component (a) falling within the above density range, it is necessary to use the weight ratio Wa (%) of the component (a) to the total weight of the component (a) and the component (b) in a specific weight ratio relative to the density Da of the polyethylene of the component (a) and particularly, it is important that the weight ratio satisfies the above formula (1).

The formula (1) means that, in the relationship between the density Da (g/cm$^3$) of the component (a) that is a high-molecular-weight component and the weight ratio Wa (%), the content ratio of the high-molecular-weight component is made relatively high in relation to the density, and is set for the purpose of distinguishing a region where the compositional ratio in relation to the density is large from a region of the compositional ratio of the high-molecular-weight component of the background art document.

When the weight ratio Wa (%) of the component (a) to the total weight of the component (a) and the component (b) falls out of the range of the above formula (1), there is a tendency that the durability decreases.

Moreover, it is further preferred that the weight ratio Wa (%) of the component (a) to the total weight of the component (a) and the component (b) satisfies the following formula (2). When the ratio falls out of the range of the formula (2), there is a tendency that the fluidity decreases.

$$Wa \leq 832 \times Da - 710 \qquad \text{Formula (2)}$$

The weight ratio Wa (%) of the component (a) is preferably 27.12 to 47.12% by weight when the density Da of the component (a) is 0.910 g/cm$^3$, while the ratio is preferably 52.08 to 72.08% by weight when the density Da of the component (a) is 0.940 g/cm$^3$. The weight ratio of the component (b) is selected so that the sum of the ratio and the weight ratio of the component (a) becomes 100% by weight.

Characteristic (4): Ratio of the weight-average molecular weight (Mw) to the number-average molecular weight (Mn) (Mw/Mn) determined by gel permeation chromatography (GPC) is 10 or more.

The polyethylene for injection molding of the invention has an Mw/Mn measured by GPC of preferably 10 or more, more preferably 15 or more, further preferably 16 or more, and more preferably, it is suitable to exceed 17.

When Mw/Mn is less than 10, the fluidity tends to be insufficient. An upper limit of Mw/Mn is not restricted but is preferably 50 or less. When it exceeds 50, the impact resistance tends to be insufficient.

The measurement of GPC can be performed by the following method.

Apparatus: Alliance GPC V2000 model manufactured by WATERS Co.

Columns: two columns of HT-806M and one column of HT-G manufactured by Showa Denko K.K.

Measurement temperature: 145° C.

Concentration: 1 mg/1 ml

Solvent: o-dichlorobenzene

Incidentally, the calculation of the molecular weight and the calibration of the column can be carried out in accordance with the following methods.

GPC chromatogram data are incorporated into a computer at a frequency of 1 point/second and data processing is performed according to the description of "Size Exclusion Chromatography", Chapter 4, written by Sadao Mori, published by Kyoritsu Shuppan Co., Ltd. Thus, Mw and Mn values can be calculated. The conversion of a measured retention volume into a molecular weight is performed using a calibration curve with standard polystyrenes, the curve being prepared in advance.

The molecular weight distribution (Mw/Mn) can be controlled within a predetermined range mainly by selecting a polymerization catalyst and polymerization conditions and also can be controlled within a predetermined range by mixing a plurality of components having different molecular weights. As the catalyst, a Ziegler catalyst is mainly mentioned as a preferable catalyst.

Characteristic (5): Rupture time in a full notch creep test (test conditions: 80° C., 6 MPa) is 20 hours or more.

The polyethylene for injection molding of the invention has a rupture time in a full notch creep test (test conditions: 80° C., 6 MPa) of preferably 20 hours or more, more preferably 25 hours or more, further suitably 30 hours or more. When the rupture time in a full notch creep test (test conditions: 80° C., 6 MPa) is less than 20 hours, there is a case where the durability of the molded article is insufficient.

The rupture time in a full notch creep test (test conditions: 80° C., 6 MPa) is measured at 80° C. and 6 MPa in accordance with the full-circumference notch-type tensile creep test of Annex 1 of JIS K6774 (1995) "Polyethylene Pipe for Gas". As a specimen, there is used one (specimen thickness: 6 mm, notch depth: 1 mm, full circumference) which is cut out from a compression molded sheet in a thickness of 6 mm and notched around full circumference, the sheet having been prepared under the conditions described in Table 2 of JIS K6922-2 (1997) "Plastic—Polyethylene (PE) Molding and Extruding Materials—Part 2: Method for Preparing Specimen and Method for Determining Various Properties".

The rupture time in a full notch creep test (test conditions: 80° C., 6 MPa) can be generally increased by reducing the density of the polyethylene.

Characteristic (6): Charpy impact strength at −40° C. is 4.0 kJ/m$^2$ or more.

The polyethylene for injection molding of the invention has a Charpy impact strength at −40° C. of 4.0 kJ/m$^2$ or more, more preferably 4.2 kJ/m$^2$ or more. When the Charpy impact strength at −40° C. is less than 4.0 kJ/m$^2$, there is a case where an insufficient impact resistance of the molded article becomes obvious. On the other hand, an upper limit value of the Charpy impact strength at −40° C. is not particularly restricted but is usually 100 kJ/m$^2$.

Here, the Charpy impact strength at −40° C. is measured in accordance with JIS K7111 (2006) "Plastic—Test Method for Charpy Impact Strength" with preparing a specimen in accordance with JIS K6922-2 (2010) "Plastic—Polyethylene (PE) Molding and Extruding Materials—Part 2: Method for Preparing Specimen and Method for Determining Various Properties".

The Charpy impact strength at −40° C. can be increased by increasing the molecular weight of the ethylene or narrowing the molecular weight distribution.

Characteristic (7): Length of spiral flow is 20 cm or more.

The polyethylene for injection molding of the invention has excellent injection moldability. The injection moldability can be evaluated by measuring spiral flow of a material, and the spiral flow can be measured, for example, using a mold (mold temperature of 40° C.) having an Archimedean spiral flow path having a runner-side gate width of 4 mm, a cavity-side gate width of 5 mm, a width of 10 mm, a thickness of 2 mm, and a longest flow path length of 2000 mm, at an injection pressure of 90 MPa under conditions of a set temperature of 210° C., an injection speed of 10 mm/second, an injection time of 5 seconds, a cooling time of 10 seconds, and a dwelling switching position of 7 mm, using ROBOSHOT S-2000i 100B injection molding machine manufactured by FANUC Corporation. One having a spiral flow length of 20 cm or more as measured by the above method exhibits good injection moldability, while one having a spiral flow length of less than 20 cm tends to exhibit poor injection moldability.

3. Production Method of Polyethylene for Injection Molding

The polyethylene for injection molding of the invention can be obtained by homopolymerizing ethylene or copolymerizing ethylene and one or more comonomers selected from α-olefins having 3 to 20 carbon atoms, preferably 3 to 15 carbon atoms, more preferably 3 to 10 carbon atoms so as to be a predetermined density.

Examples of the α-olefins to be copolymerized include propylene, 1-butene, 1-pentene, 3-methyl-1-butene, 3-methyl-1-pentene, 4-methyl-1-pentene, 1-hexene, 1-octene, 1-decene, 1-tetradecene, 1-hexadecene, 1-octadecene, 1-eicosene, and the like. From the viewpoints of durability and economical efficiency, particularly propylene, 1-butene, and 1-hexene are preferred.

Furthermore, as the comonomer to be copolymerized with ethylene, there can be also used a vinyl compound such as vinyl acetate, acrylic acid, methacrylic acid, vinylcyclohexane, styrene, or a derivative thereof.

Moreover, these α-olefins may be used singly or two or more thereof may be used in combination.

The content of the α-olefin in the ethylene-α-olefin copolymer is 10% by weight or less, preferably 0.1 to 10% by weight, and more preferably 0.1 to 5% by weight. When the content of the α-olefin is more than 10% by weight, the rigidity tends to decrease.

The polyethylene of the invention is obtained by polymerizing mainly ethylene using known each catalyst such as a Ziegler catalyst or a metallocene catalyst. Preferably, it is suitable to perform the polymerization using a Ziegler catalyst composed of a transition metal compound of titanium, zirconium, or the like or a magnesium compound.

The polyethylene for injection molding of the invention may be obtained by mixing the component (a) and the component (b) after they are produced separately or by performing continuous polymerization using a plurality of reactors. It may be composed of polyethylene components having different two types of physical properties.

The polyethylene obtained by a continuous multistage polymerization method may be one in which, for example, at the time of polymerization, in a plurality of reactors connected in series, the polyethylene component (a) that is a high-molecular-weight component may be formed by polymerization in the first reactor and the polyethylene component (b) that is a low-molecular-weight component is formed by polymerization in the second reactor or one obtained by polymerization in reverse order.

To the polyethylene for injection molding of the invention, various known additives, fillers, and the like may be added in appropriate amounts within the range where the advantage of the invention is not remarkably impaired.

As the additives, for example, one or two or more types of antioxidants (phenol-based, phosphorus-based, sulfur-based), lubricants, antistatic agents, light stabilizers, colorants, pigments, dyes, ultraviolet absorbers, nucleating agents, neutralizing agents, blocking inhibitors, dispersants, fluidity improvers, plasticizers, release agents, flame retardants, compatibilizers, adhesives, and the like may be appropriately used singly or in combination. Further, as the filler, for example, it is possible to use talc, mica, or the like.

In addition, a maleic anhydride-modified resin, a thermoplastic resin, a rubber, or the like may be added to the polyethylene for injection molding of the invention, if necessary.

Moreover, for improving a property of fuel permeation, the polyethylene for injection molding of the invention can be used in combination with a polyamide such as Nylon 6 or an ethylene-vinyl alcohol copolymer (EVOH), preferably EVOH as a fuel-resistant permeation preventive resin (or a fuel barrier resin).

4. Molding Method of Polyethylene for Injection Molding

The polyethylene for injection molding of the invention can be transformed into a molded article by a molding method such as an injection molding method, a blow molding method, or an extrusion molding method but preferably, is a material suitable for injection molding and thus can be subjected to injection molding at low temperature and at high speed.

5. Use Applications of Polyethylene for Injection Molding

The polyethylene for injection molding of the invention is preferably molded into any one molded article selected from the group consisting of fuel tanks, oil tanks, urea water tanks, and welding parts.

As the molded article to be molded from the polyethylene for injection molding of the invention, particularly a container formed by injection molding is mentioned as a preferable example. As the container, there may be mentioned fuel tanks, oil tanks, urea water tanks, containers for industrial chemicals, drum cans, and the like, and, in addition to the containers, there may be mentioned various parts, welding parts, and the like.

The fuel tank of the injection-molded article according to the invention can be molded by a known method and can be, for example, obtained by welding divided molded bodies, which have been formed into the two divided bodies by injection molding, at respective welding portions thereof each other.

The fuel permeation resistance of the fuel tank can be imparted, for example, by mixing a fuel barrier material (e.g., the aforementioned fuel-resistant permeation preventive resin) with the resin of the invention and subjecting the mixture to injection molding to make the fuel barrier material present in a layer-like, island-like, and/or the other shape in the molded article or by subjecting the barrier material and a multilayered sheet or film of the polyethylene to in-mold molding. Also, the fuel permeation resistance can be imparted by combining the molded article formed from the resin of the invention and a separately prepared fuel barrier material with an adhesive or the like or further by applying a fuel barrier coating onto the molded article formed from the resin of the invention.

As the fuel barrier material, a known material can be used, and there may be mentioned resins such as EVOH (ethylene-vinyl alcohol copolymer) and Nylon, inorganic fillers such as clay, metals such as aluminum, epoxy-based coatings, and the like.

The polyethylene for injection molding of the invention can be suitably used as a resin for not only large-sized containers but also small parts to be attached to large-sized containers, for example, in cans for industrial chemicals and drum cans, parts such as caps, supply ports of inner solutions, or outlet ports; in fuel tanks, fuel supply ports, valves, or fuel pump fixing caps that are welded to the fuel tank bodies; and the like. The small parts include various parts such as a hollow pipe-shaped small part playing a role of a handle, a supply port for inner solutions, or an outlet port, a reinforcing part for the opening of a large-sized container, an inlet, and an opening liner, which are integrally attached to a large-sized container by welding to the large-sized container.

In addition, targets may be small parts that are separately handled from so-called large-sized containers and changed in design into many predetermined shapes, such as caps for the large-sized containers, for example, a cap provided with a thread on the inner surface for attachment to the thread of the large-sized container, a simple fitting type cap for the mouth of the large-sized container, and the like.

EXAMPLES

The following will describe the present invention in more detail with reference to Examples, but the invention should not be construed as being limited to these Examples.

Incidentally, physical properties of polyethylene and the like were measured by the following methods.

(1) Density

It was measured in accordance with JIS K7112 (1999).

(2) High Load Melt Flow Rate (HLMFR) (Test Conditions: 190° C., a Load of 21.6 kg)

It was measured in accordance with JIS K6922-1 (1997). Further, the melt flow rate (MFR) (test conditions: 190° C., a load of 2.16 kg) was also measured in accordance with JIS K6922-1 (1997).

(3) Ratio of Weight-average Molecular Weight (Mw) to Number-average Molecular Weight (Mn) (Mw/Mn) Measured by Gel Permeation Chromatography (GPC)

Measurement by GPC was performed by the following method.

Apparatus: Alliance GPC V2000 model manufactured by WATERS Co.

Columns: two columns of HT-806M and one column of HT-G manufactured by Showa Denko K.K.

Measurement temperature: 145° C.

Concentration: 1 mg/1 ml

Solvent: o-dichlorobenzene

Incidentally, the calculation of the molecular weight and the calibration of the columns were carried out in accordance with the following methods.

GPC chromatogram data were incorporated into a computer at a frequency of 1 point/second, data processing was performed according to the description in Chapter 4 of "Size Exclusion Chromatography" written by Sadao Mori published by Kyoritsu Shuppan Co., Ltd. to calculate Mw and Mn values. The conversion of a measured retention volume into a molecular weight was performed using a calibration curve with standard polystyrenes, the curve being prepared in advance.

(4) Rupture Time in Full Notch Creep Test (Test Conditions: 80° C., 6 MPa)

Measurement was performed at 80° C. and 6 MPa in accordance with the full-circumference notch-type tensile creep test of Annex 1 of JIS K6774 (1995). As a specimen, there was used one (specimen thickness: 6 mm, notch depth: 1 mm, full circumference) which was cut out from a compression molded sheet in a thickness of 6 mm and notched around full circumference, the sheet having been prepared under the conditions described in Table 2 of JIS K6922-2 (2010). Incidentally, the results are shown as "FNCT" in Tables.

(5) Charpy Impact Strength at −40° C.

A specimen was prepared in accordance with JIS K6922-2 (2010) and the measurement was performed in accordance with JIS K7111 (2006).

(6) Spiral Flow

The spiral flow length was measured using a mold (mold temperature of 40° C.) having an Archimedean spiral flow path having a runner-side gate width of 4 mm, a cavity-side gate width of 5 mm, a width of 10 mm, a thickness of 2 mm, and a longest flow path length of 2000 mm, at an injection pressure of 90 MPa under conditions of a set temperature of 210° C., an injection speed of 10 mm/second, an injection time of 5 seconds, a cooling time of 10 seconds, and a dwelling switching position of 7 mm, using ROBOSHOT S-2000i 100B injection molding machine manufactured by FANUC Corporation. Those having a spiral flow length of 20 cm or more as measured by the above method were rated as good injection moldability "○", while those having a spiral flow length of less than 20 cm were rated as bad injection moldability "X".

(7) Impact Resistance of Injection-molded Article

A resin was melted and mixed at 230° C. and was molded into a rectangular box-shaped concave container having a length of 100 mm, a width of 100 mm, a height of 50 mm, a thickness of 3 mm, a weight of 120 g, and a volume of 500 ml under conditions of a molding temperature of 230° C., a mold temperature of 40° C., and a cooling time of 20 seconds using an injection molding machine (IS150E manufactured by Toshiba Machine Co., Ltd.). A rectangular box-shaped concave container having the same shape as above was produced by the same method, and, using the two rectangular box-shaped concave containers, a closed container was prepared by melting the edge portions of the mouths of the respective containers by a hot plate at 200° C. and attaching and welding the edge portions of the respective containers.

Then, a hole having a diameter of about 10 mm was opened on the upper surface of the closed container, a 50% by weight aqueous solution of ethylene glycol was charged from the hole, and the hole was then tightly closed. The resulting container was subjected to a dropping test from a height of 6 m at −40° C. and the presence of abnormality was confirmed.

As evaluation criteria, those having no problem in appearance and no abnormality was rated as "○" and those having improper appearance or abnormality were rated as "X".

(8) Durability of Injection-molded Article

A resin was melted and mixed at 230° C. and was molded into a rectangular box-shaped concave container having a length of 100 mm, a width of 100 mm, a height of 50 mm, a thickness of 3 mm, a weight of 120 g, and a volume of 500 ml under conditions of a molding temperature of 230° C., a mold temperature of 40° C., and a cooling time of 20 seconds using an injection molding machine (IS150E manufactured by Toshiba Machine Co., Ltd.). A rectangular box-shaped concave container having the same shape as above was produced by the same method, and, using the two rectangular box-shaped concave containers, a closed container was prepared by melting the edge portions of the mouths of the respective containers by a hot plate at 200° C. and attaching and welding the edge portions of the respective containers. The molded container was stored at 80° C. for 1000 hours and the presence of abnormality was confirmed.

As evaluation criteria, those having no problem in appearance and no abnormality was rated as "○" and those having improper appearance or abnormality were rated as "X".

(9) Overall Evaluation

Those that are evaluated as "○" in all the evaluations of the injection moldability, the impact resistance of the injection-molded articles, and the durability of the injection-molded articles were rated as "○".

Those any one of the evaluations of the injection moldability, the impact resistance of the injection-molded articles, and the durability of the injection-molded articles was "X" were rated as "X".

Example 1

Using a Ziegler catalyst, the polymerization of ethylene and 1-butene was carried out through multistage polymerization with two reactors to produce a polyethylene having the characteristics described in Table 1. For the resulting polyethylene, the evaluation results as an injection-molded article were shown in Table 1.

The polyethylene has good injection moldability and exhibited good properties in both of durability (FNCT) and Charpy impact strength.

Example 2

The polymerization of ethylene and 1-butene was carried out in the same manner as in Example 1 to produce a polyethylene having the characteristics described in Table 1. For the resulting polyethylene, the evaluation results as an injection-molded article were shown in Table 1.

The polyethylene has good injection moldability and exhibited good properties in both of durability (FNCT) and Charpy impact strength.

Example 3

The polymerization of ethylene and 1-butene was carried out in the same manner as in Example 1 to produce a polyethylene having the characteristics described in Table 1. For the resulting polyethylene, the evaluation results as an injection-molded article were shown in Table 1.

The polyethylene has good injection moldability and exhibited good properties in both of durability (FNCT) and Charpy impact strength.

Example 4

The polymerization of ethylene and 1-butene was carried out in the same manner as in Example 1 to produce a polyethylene having the characteristics described in Table 1. For the resulting polyethylene, the evaluation results as an injection-molded article were shown in Table 1.

The polyethylene has good injection moldability and had good properties in both of durability (FNCT) and Charpy impact strength.

Example 5

The polymerization of ethylene and 1-butene was carried out in the same manner as in Example 1 to produce a polyethylene having the characteristics described in Table 1.

For the resulting polyethylene, the evaluation results as an injection-molded article were shown in Table 1.

The polyethylene has good injection moldability and exhibited good properties in both of durability (FNCT) and Charpy impact strength.

Example 6

The polymerization of ethylene and 1-butene was carried out in the same manner as in Example 1 to produce a polyethylene having the characteristics described in Table 1. For the resulting polyethylene, the evaluation results as an injection-molded article were shown in Table 1.

The polyethylene has good injection moldability and exhibited good properties in both of durability (FNCT) and Charpy impact strength.

Example 7

The polymerization of ethylene and 1-butene was carried out in the same manner as in Example 1 to produce a polyethylene having the characteristics described in Table 1. For the resulting polyethylene, the evaluation results as an injection-molded article were shown in Table 1.

The polyethylene has good injection moldability and exhibited good properties in both of durability (FNCT) and Charpy impact strength.

Example 8

The polymerization of ethylene and 1-hexene was carried out in the same manner as in Example 1 to produce a polyethylene having the characteristics described in Table 1. For the resulting polyethylene, the evaluation results as an injection-molded article were shown in Table 1.

The polyethylene has good injection moldability and exhibited good properties in both of durability (FNCT) and Charpy impact strength.

Comparative Example 1

Instead of the polyethylene of Example 1, for the polyethylene having an HLMFR of 31 g/10 minutes and a density of 0.948 g/cm$^3$ and exhibiting the characteristics shown in Table 2, evaluation as an injection-molded article was performed. The results were shown in Table 2. The spiral flow was small and the injection moldability was insufficient.

Comparative Example 2

Instead of the polyethylene of Example 1, for the polyethylene having an HLMFR of 205 g/10 minutes and a density of 0.953 g/cm$^3$ and exhibiting the characteristics shown in Table 2, evaluation as an injection-molded article was performed. The results were shown in Table 2. The Charpy impact strength was small and the impact resistance was insufficient.

Comparative Example 3

Instead of the polyethylene of Example 1, for the polyethylene which did not conform the formula (1) and exhibited the characteristics shown in Table 2, evaluation as an injection-molded article was performed. The results were shown in Table 2. FNCT was small and the durability was insufficient.

Comparative Example 4

Instead of the polyethylene of Example 1, for the polyethylene which did not conform the formula (1) and exhibited the characteristics shown in Table 2, evaluation as an injection-molded article was performed. The results were shown in Table 2. FNCT was small and the durability was insufficient.

Comparative Example 5

Instead of the polyethylene of Example 1, for the polyethylene which did not conform the formula (1) and exhibited the characteristics shown in Table 2, evaluation as an injection-molded article was performed. The results were shown in Table 2. FNCT was small and the durability was insufficient.

Comparative Example 6

Instead of the polyethylene of Example 1, for the polyethylene which did not conform the formula (1) and exhibited the characteristics shown in Table 2, evaluation as an injection-molded article was performed. The results were shown in Table 2. FNCT was small and the durability was insufficient.

Comparative Example 7

Instead of the polyethylene of Example 1, for the polyethylene, in which MFR of the component (b) was 700 g/cm$^3$ and the polyethylene exhibited the characteristics shown in Table 2, evaluation as an injection-molded article was performed. The results were shown in Table 2. The Charpy impact strength was small and the impact resistance was insufficient.

TABLE 1

| | | | Example 1 | Example 2 | Example 3 | Example 4 | Example 5 | Example 6 | Example 7 | Example 8 |
|---|---|---|---|---|---|---|---|---|---|---|
| Characteristics of polyethylene | HLMFR | g/10 minutes | 95 | 63 | 135 | 83 | 103 | 91 | 110 | 97 |
| | Density | g/cm$^3$ | 0.952 | 0.951 | 0.952 | 0.951 | 0.950 | 0.951 | 0.950 | 0.949 |
| | HLMFR of component (a) | g/10 minutes | 0.7 | 0.8 | 1.2 | 1.8 | 0.7 | 2.5 | 2.0 | 2.1 |
| | Density of component (a) | g/cm$^3$ | 0.919 | 0.918 | 0.918 | 0.923 | 0.915 | 0.935 | 0.930 | 0.925 |
| | MFR of component (b) | g/10 minutes | 350 | 200 | 400 | 300 | 300 | 400 | 250 | 200 |

TABLE 1-continued

|  |  |  | Example 1 | Example 2 | Example 3 | Example 4 | Example 5 | Example 6 | Example 7 | Example 8 |
|---|---|---|---|---|---|---|---|---|---|---|
|  | Density of component (b) | g/cm³ | 0.970 | 0.969 | 0.971 | 0.970 | 0.970 | 0.971 | 0.969 | 0.969 |
|  | Ratio of component (a) to total amount of component (a) and component (b) | % by weight | 35.0 | 35.0 | 35.0 | 40.0 | 33.0 | 50.0 | 45.0 | 45.0 |
|  | Calculated value of right side of formula (1) | — | 34.6 | 33.8 | 33.8 | 37.9 | 31.3 | 47.9 | 43.8 | 39.6 |
|  | Conformity to formula (1) | — | conform | conform | conform | conform | conform | conform | conform | conform |
|  | Mw/Mn |  | 25 | 22 | 24 | 20 | 21 | 18 | 17 | 16 |
|  | FNCT | hour | 92 | 118 | 73 | 86 | 145 | 53 | 65 | 125 |
|  | Charpy impact strength | KJ/m² | 4.6 | 5.4 | 4.2 | 5.0 | 4.7 | 4.4 | 5.1 | 4.9 |
| Evaluations of injection-molded article | Spiral flow | cm | 40 | 31 | 47 | 36 | 39 | 36 | 37 | 36 |
|  | Injection moldability | — | ○ | ○ | ○ | ○ | ○ | ○ | ○ | ○ |
|  | Impact resistance of injection-molded article | — | ○ | ○ | ○ | ○ | ○ | ○ | ○ | ○ |
|  | Durability of injection-molded article | — | ○ | ○ | ○ | ○ | ○ | ○ | ○ | ○ |
|  | Overall evaluation | — | ○ | ○ | ○ | ○ | ○ | ○ | ○ | ○ |

TABLE 2

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Characteristics of polyethylene | HLMFR | g/10 minutes | 31 | 205 | 98 | 91 | 108 | 118 | 142 |
|  | Density | g/cm³ | 0.948 | 0.953 | 0.952 | 0.951 | 0.951 | 0.950 | 0.953 |
|  | HLMFR of component (a) | g/10 minutes | 0.3 | 4.8 | 1.0 | 0.6 | 2.4 | 1.9 | 2.0 |
|  | Density of component (a) | g/cm³ | 0.918 | 0.921 | 0.923 | 0.916 | 0.935 | 0.930 | 0.922 |
|  | MFR of component (b) | g/10 minutes | 100 | 450 | 300 | 350 | 400 | 250 | 700 |
|  | Density of component (b) | g/cm³ | 0.968 | 0.971 | 0.970 | 0.970 | 0.971 |  | 0.972 |
|  | Ratio of component (a) to total amount of component (a) and component (b) | % by weight | 35.0 | 37.0 | 35.0 | 30.0 | 47.0 | 42.0 | 40.0 |
|  | Calculated value of right side of formula (1) | — | 33.8 | 36.3 | 37.9 | 32.1 | 47.9 | 43.8 | 37.1 |
|  | Conformity to formula (1) | — | conform | conform | not conform | not conform | not conform | not conform | conform |
|  | Mw/Mn |  | 15 | 14 | 23 | 25 | 17 | 17 | 28 |
|  | FNCT | hour | 142 | 43 | 15 | 8 | 12 | 10 | 81 |
|  | Charpy impact strength | KJ/m² | 6.5 | 3.4 | 4.8 | 4.5 | 4.2 | 4.9 | 3.7 |
| Evaluations of injection-molded article | Spiral flow | cm | 19 | 55 | 34 | 41 | 38 | 38 | 48 |
|  | Injection moldability | — | X | ○ | ○ | ○ | ○ | ○ | ○ |
|  | Impact resistance of injection-molded article | — | ○ | X | ○ | ○ | ○ | ○ | X |
|  | Durability of injection-molded article | — | ○ | ○ | X | X | X | X | ○ |
|  | Overall evaluation | — | X | X | X | X | X | X | X |

[Evaluation]

Figure 1:
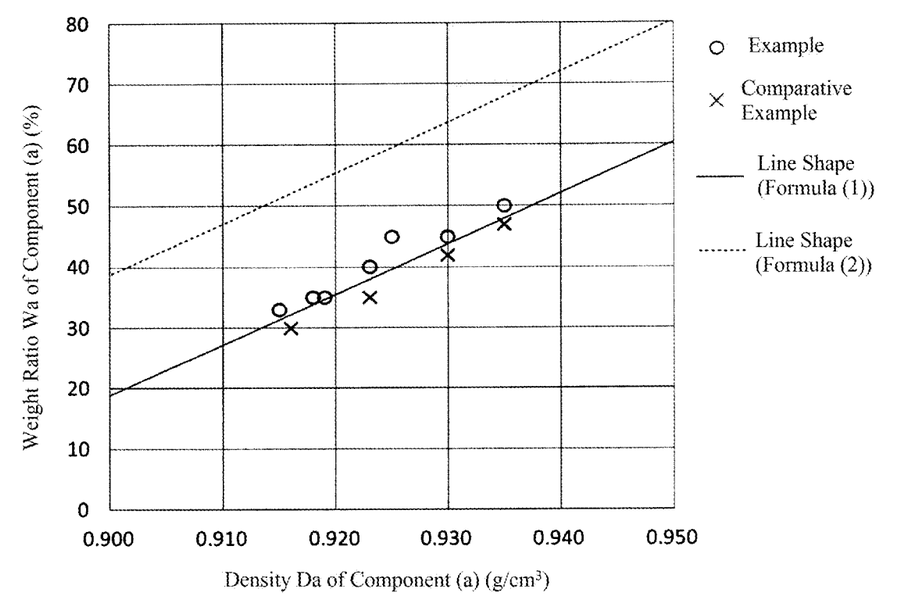
FIG. 1 is a graph showing a relation between a weight ratio Wa (%) of the component (a) to the total amount of the component (a) and the component (b) of the present invention and a density Da (g/cm$^3$) of the component (a).

FIG. 1 shows the relation between the weight ratio Wa (%) of the component (a) to the total weight of the component (a) and the component (b) and the density Da (g/cm³) of the component (a). As a result, it is understood that Examples all satisfy the formula (1) and the formula (2) but Comparative Examples all do not satisfy the formula (1).

Further, from the results shown in Table 1, when Examples 1 to 8 and Comparative Examples 1 to 7 were compared, Examples 1 to 8 that satisfied the specific requirements for the polyethylene for injection molding of the invention exhibited excellent injection moldability and exhibited excellent impact resistance and durability of the injection-molded articles.

On the other hand, since HLMFR of the polyethylene for injection molding was small, Comparative Example 1 exhibited poor injection moldability. Since HLMFR of the polyethylene for injection molding was large, Comparative Example 2 exhibited poor impact resistance of the injection-molded article. Because of no conformity to the formula (1), Comparative Examples 3 to 6 exhibited small FNCT and the durability of the injection-molded articles was poor. Since MFR of the component (b) was large, Comparative Example 7 exhibited low Charpy impact strength and the impact resistance of the injection-molded article was poor.

While the invention has been described in detail and with reference to specific embodiments thereof, it will be apparent to one skilled in the art that various changes and modifications can be made therein without departing from the spirit and scope thereof. The present application is based on Japanese Patent Application No. 2015-065098 filed on Mar. 26, 2015, and the contents are incorporated herein by reference.

INDUSTRIAL APPLICABILITY

The molded article obtained from the resin of the present invention can be used as a large-sized injection-molded plastic fuel tank having excellent balance between moldability and durability, particularly excellent balance among injection moldability, durability, and impact resistance and having excellent durability, so that the molded article has industrially very high utility value.

The invention claimed is:

1. A polyethylene for injection molding, comprising component (a) and component (b):

Component (a): a polyethylene having a density of 0.910 to 0.940 g/cm$^3$ and a high load melt flow rate (HLMFR), under 190° C. and a load of 21.6 kg, of 0.1 to 5.0 g/10 minutes; and Component (b): a polyethylene having a density of 0.960 to 0.980 g/cm$^3$ and a melt flow rate (MFR), under 190° C. and a load of 2.16 kg, of 1 to 500 g/10 minutes, wherein the polyethylene satisfies characteristics (1) to (4):

Characteristic (1): a density is 0.935 to 0.970 g/cm$^3$,

Characteristic (2): HLMFR is 50 to 200 g/10 minutes,

Characteristic (3): a relation of a weight ratio Wa (%) of the component (a) to the total weight of the component (a) and the component (b) and the density Da (g/cm$^3$) of the component (a) satisfies the following formula (1):

$$Wa \geq 832 \times Da \times 730 \quad \text{Formula (1), and}$$

Characteristic (4): a ratio of weight-average molecular weight (Mw) to number-average molecular weight (Mn) (Mw/Mn) measured by gel permeation chromatography (GPC) is 16 or more.

2. The polyethylene for injection molding according to claim 1, which further satisfies characteristic (5):

Characteristic (5): a rupture time in a full notch creep test, under 80° C. and 6 MPa, is 20 hours or more.

3. The polyethylene for injection molding according to claim 1, which further satisfies characteristic (6):

Characteristic (6): a Charpy impact strength at ×40° C. is 4.0 kJ/m$^2$ or more.

4. The polyethylene for injection molding according to claim 1, wherein the density of the polyethylene is 0.936 to 0.968 g/cm$^3$.

5. The polyethylene for injection molding according to claim 1, wherein the density of the polyethylene is 0.940 to 0.965 g/cm$^3$.

6. The polyethylene for injection molding according to claim 1, wherein HLMFR of the polyethylene is 55 to 155 g/10 minutes.

7. The polyethylene for injection molding according to claim 1, wherein HLMFR of the polyethylene is 60 to 150 g/10 minutes.

8. The polyethylene for injection molding according to claim 1, wherein HLMFR of the polyethylene is 83 to 135 g/10 minutes.

9. The polyethylene for injection molding according to claim 1, wherein the ratio of weight-average molecular weight (Mw) to number-average molecular weight (Mn) (Mw/Mn) measured by gel permeation chromatography (GPC) of the polyethylene is 16 to 50.

10. The polyethylene for injection molding according to claim 1, wherein the ratio of weight-average molecular weight (Mw) to number-average molecular weight (Mn) (Mw/Mn) measured by gel permeation chromatography (GPC) of the polyethylene is 16 to 25.

11. The polyethylene for injection molding according to claim 1, wherein HLMFR of the polyethylene is 83 to 135 g/10 minutes and the ratio of weight-average molecular weight (Mw) to number-average molecular weight (Mn) (Mw/Mn) measured by gel permeation chromatography (GPC) of the polyethylene is 16 to 25.

12. A molded article obtained by injection molding the polyethylene of claim 1.

13. The molded article according to claim 12, wherein the molded article is at least any one selected from the group consisting of a fuel tank, an oil tank, a urea water tank and a welding part.

* * * * *